United States Patent [19]

Kowert

[11] Patent Number: 5,513,340
[45] Date of Patent: Apr. 30, 1996

[54] VIDEO MEMORY CLOCK SELECTION CIRCUIT AND METHOD

[75] Inventor: Robert C. Kowert, Pflugerville, Tex.

[73] Assignee: Dell USA, L.P., Austin, Tex.

[21] Appl. No.: 198,795

[22] Filed: Feb. 14, 1994

[51] Int. Cl.⁶ .................................................. G06F 1/08
[52] U.S. Cl. ................... 395/550; 395/164; 364/DIG. 1; 364/270.3; 364/237.2; 364/245.6
[58] Field of Search ..................................... 395/164, 165, 395/550; 364/DIG. 1 MS File, DIG. 2 MS File

[56] References Cited

U.S. PATENT DOCUMENTS 5,276,856  1/1994  Norsworthy et al. .................. 395/550
5,293,468  3/1994  Nye et al. ............................... 395/164

*Primary Examiner*—Thomas M. Heckler
*Attorney, Agent, or Firm*—Henry Garrana; Michelle Turner

[57] ABSTRACT

Disclosed are a configuration-dependent video memory clock selection circuit and method for a computer system. The selection circuit operates in conjunction with a removable video memory module. The module comprises: (1) a circuit board capable of insertion into the computer system as a daughter-card, (2) a plurality of video memory chips located on the circuit board and having a particular logical configuration and (3) a configuration indication circuit located on the circuit board, the indication circuit capable of providing a configuration signal representing the particular logical configuration to video clock signal generator circuitry in the computer system when the circuit board is inserted into the computer system. Thus, the configuration indication circuit and the video clock signal generator circuitry act in concert to provide a configuration-dependent video memory clock selection circuit.

28 Claims, 5 Drawing Sheets

VIDEO MEMORY CLOCK SELECTION CIRCUIT AND METHOD

TECHNICAL FIELD OF THE INVENTION

The present invention is directed, in general, to visual displays for computing devices and, more specifically, to a circuit and method for varying video memory clock frequency as a function of video memory configuration to optimize visual display performance.

BACKGROUND OF THE INVENTION

The preferred way of providing output on today's personal computers ("PCs") is by way of a video display. A video display allows a PC to display data for the benefit of a user in a temporary, rapidly mutable fashion. A video display is coupled to a microprocessor central processing unit ("CPU") of the PC via a video controller, allowing the CPU to send data to the video display. The video controller acts as a translator or interface, receiving logic signals from the CPU and generating corresponding video driver signals in response thereto.

It is common practice to provide a memory-mapped video display in PC architectures. In memory mapping, a portion of the PC's memory is designated as video memory, dedicated to storing data to be displayed on the video display. Specific, individually-addressable locations within the video memory correspond to individual pixels, or "picture elements," on the video display. In a memory-mapped PC, the CPU writes the data to be displayed to the video memory. The video controller scans the video memory, sending video driver signals to the video display based on the contents of the video memory. Although video memory appears no different than other memory to the CPU, video memory is "dual port," allowing access from one side by the CPU and access from another side by the video controller Alternatively, single ported DRAM may be used in configurations where the CPU accesses the DRAM through a video controller.

Video memory is conventionally available in the form of plug-in modules comprising a circuit board having video memory chips located thereon and adapted to be installed in a slot of the computer as a daughter-card. The modular construction of the video memory allows for ease of installation and a number of different memory sizes and logical configurations.

The video controller accesses the video memory by scanning it address by address. Since the video memory corresponds to the cartesian arrangement of pixels on the video display, the video controller is thought of as scanning the video memory column by column and row by row. The video controller uses a video memory clock to control the rate at which it scans the video memory. The video memory clock provides the timing to generate control signals, such as row address strobe ("RAS") and column address strobe ("CAS"), to the video memory.

In the past, video controllers were driven by clock signal from a video memory clock having a single frequency. In prior art computers, the video memory clock was set to a certain frequency during manufacture and was not changeable. Frequently, video controllers in these prior art computers were provided with the capability of operating in a number of different video modes, depending upon the size and logical configuration of the video memory, such as modes in which the video memory is scanned in an interleaved manner. Each mode typically yields optimum performance at a different clock frequency.

For example, interleaving is only possible when two banks of memory are present. This requires a fairly large amount of memory. Interleaving also requires stricter timings. Thus, the video clock frequency must be lowered to allow sufficient timing tolerance. If non-interleaved memory is used in a computer in which the video clock frequency has been lowered to accommodate interleaved memory, performance of the non-interleaved memory configuration suffers, since the video memory clock frequency could be set at a faster rate.

Unfortunately, since the prior art video memory clocks were of single frequency, the frequency had to be set as high as possible, although not exceeding the highest allowed frequency of any given mode, resulting in a frequency compromise. Thus, while some slower video modes were driven at their limits, faster modes were underdriven, resulting in relatively poor performance.

Some manufacturers enhanced performance of the faster modes by increasing clock frequency. However, they did so at the risk of driving the slower modes outside of the normal operating ranges of components in the video controller, bringing about a chance of failures.

What is needed in the art are a circuit and method for detecting video memory configuration and for adjusting the frequency of the video memory clock as a function thereof, allowing the video display to operate at optimum performance in every one of several possible video memory configurations and video modes.

SUMMARY OF THE INVENTION

To address the above-discussed deficiencies of the prior art, it is a primary object of the present invention to provide a configuration-dependent video memory clock selection circuit and method to allow the video memory clock frequency to change automatically as a function of video memory configuration.

In the attainment of the above-described primary object, the present invention provides a video memory module comprising: (1) a circuit board capable of insertion into the computer system as a daughter-card, (2) a plurality of video memory chips located on the circuit board and having a particular logical configuration and (3) a configuration indication circuit located on the circuit board, the indication circuit capable of providing a configuration signal representing the particular logical configuration to video clock signal generator circuitry in the computer system when the circuit board is inserted into the computer system. Thus, the configuration indication circuit and the video clock signal generator circuitry act in concert to provide a configuration-dependent video memory clock selection circuit for generating a video memory clock signal.

In a preferred embodiment, the configuration indication circuit comprises a hard-wired circuit pre-configured as a function of the particular logical memory configuration and capable of generating the configuration signal. The advantage of this embodiment is that proprietary video memory modules can be constructed featuring the hard-wired circuit. This ensures that the correct memory configuration is determined each time the PC is started. Alternatively, the configuration indication circuit could comprise a circuit capable of determining and storing a number representing the particular logical configuration. The advantage of this embodiment is that the present invention can be used with video memory modules not having the proprietary hard-wired configuration indication circuit. This expands the realm of sources for video memory modules.

Two alternative embodiments are also possible for the video clock signal generator circuitry as disclosed above. In one embodiment, the video clock signal generator circuitry comprises: (1) decode logic capable of decoding the configuration signal into a corresponding clock frequency select signal and (2) an oscillator circuit capable of receiving the corresponding clock frequency select signal and generating the video memory clock signal therefrom. In an alternative, preferred embodiment, the second circuit comprises an off-the-shelf video clock generator circuit capable of receiving the configuration signal and generating the video memory clock signal therefrom.

As previously mentioned, video clock timing is particularly strict when the video memory is interleaved. Thus, in one embodiment of the present invention, the video memory is interleaved, thereby requiring a lowering of the frequency of the video memory clock.

The present invention further provides a method of scanning video memory in a PC, comprising the steps of: (1) providing a microprocessor CPU, (2) coupling a video memory module to the microprocessor CPU, the video memory having a particular configuration and being capable of being coupled to and decoupled from the CPU as a module, (3) generating a memory configuration signal with a hard-wired memory configuration circuit within the video memory module, the memory configuration signal representing the particular configuration of the video memory on a plurality of clock select lines on the video memory module, (4) receiving the memory configuration signal from the memory configuration circuit into a video clock generator circuit coupled to the plurality of clock select lines, the video clock generator circuit generating, in response thereto, a configuration-dependent video memory clock signal that varies as a function of the configuration signal and (5) scanning the video memory at a rate determined by the video memory clock signal with a video controller circuit.

The foregoing has outlined rather broadly the features and technical advantages of the present invention so that the detailed description of the invention that follows may be better understood. Additional features and advantages of the invention will be described hereinafter which form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1A:
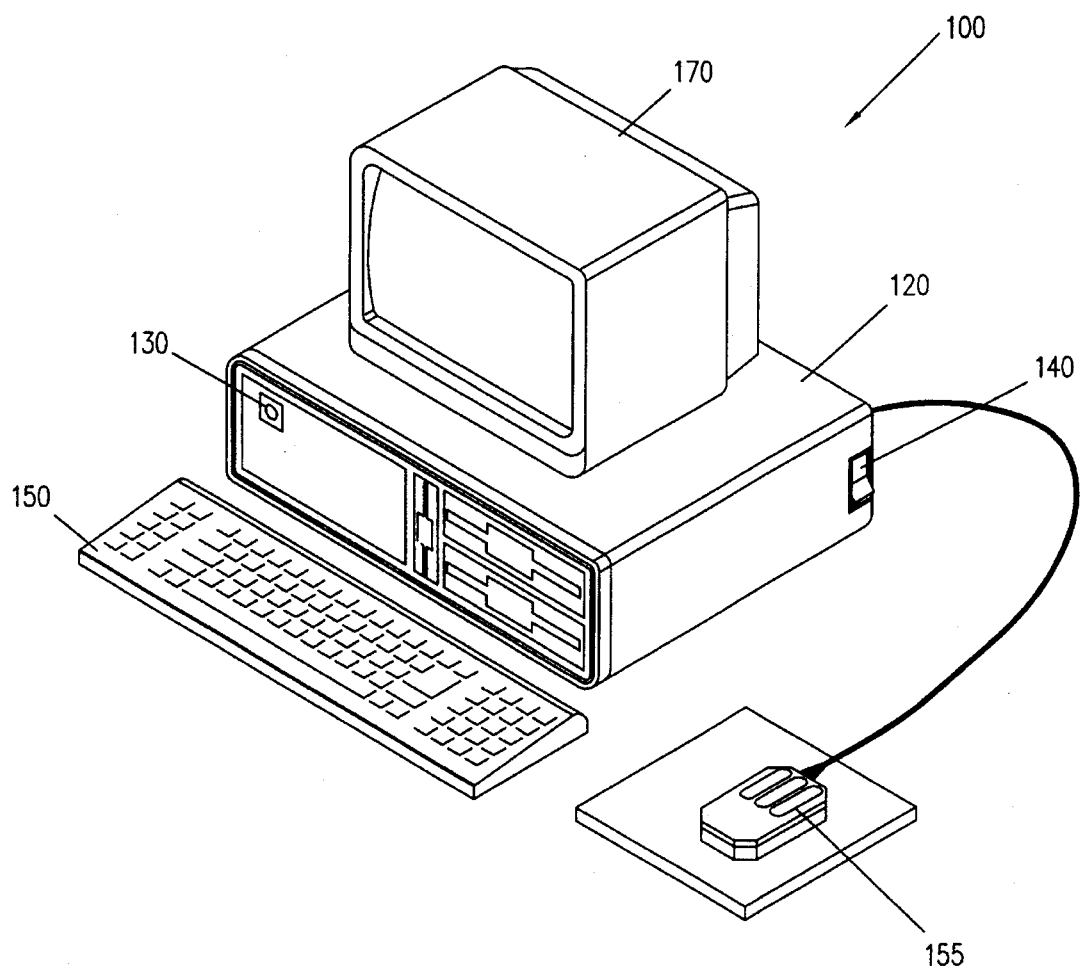
FIG. 1A illustrates an isometric view of a PC that provides an environment within which the present invention can operate.

Referring initially to FIG. 1A, illustrated is an isometric view of a PC 100 that provides an environment within which the present invention can operate. Since the present invention is not limited to application in a PC environment, however, FIG. 1 is illustrative only. The PC 100 includes a monitor 110, a main chassis 120, within which are various electronic components of the PC (not shown) and a keyboard 150. The monitor 110 and the keyboard 150 cooperate to allow communication between the PC 100 and a user. The main chassis 120 includes a dedicated hardware reset switch 130 adapted to trigger hardware reset circuitry within the computer chassis (not shown in FIG. 1) to "reboot" or restart the PC when the user depresses the reset switch 130. The computer chassis 120 further includes a power switch 140 that is capable of interrupting power to the PC 100. Interruption and restoration of power also brings about a restart of the PC 100. Finally, a mouse 155 operates as a pointing input device in a conventional manner.

Figure 1B:
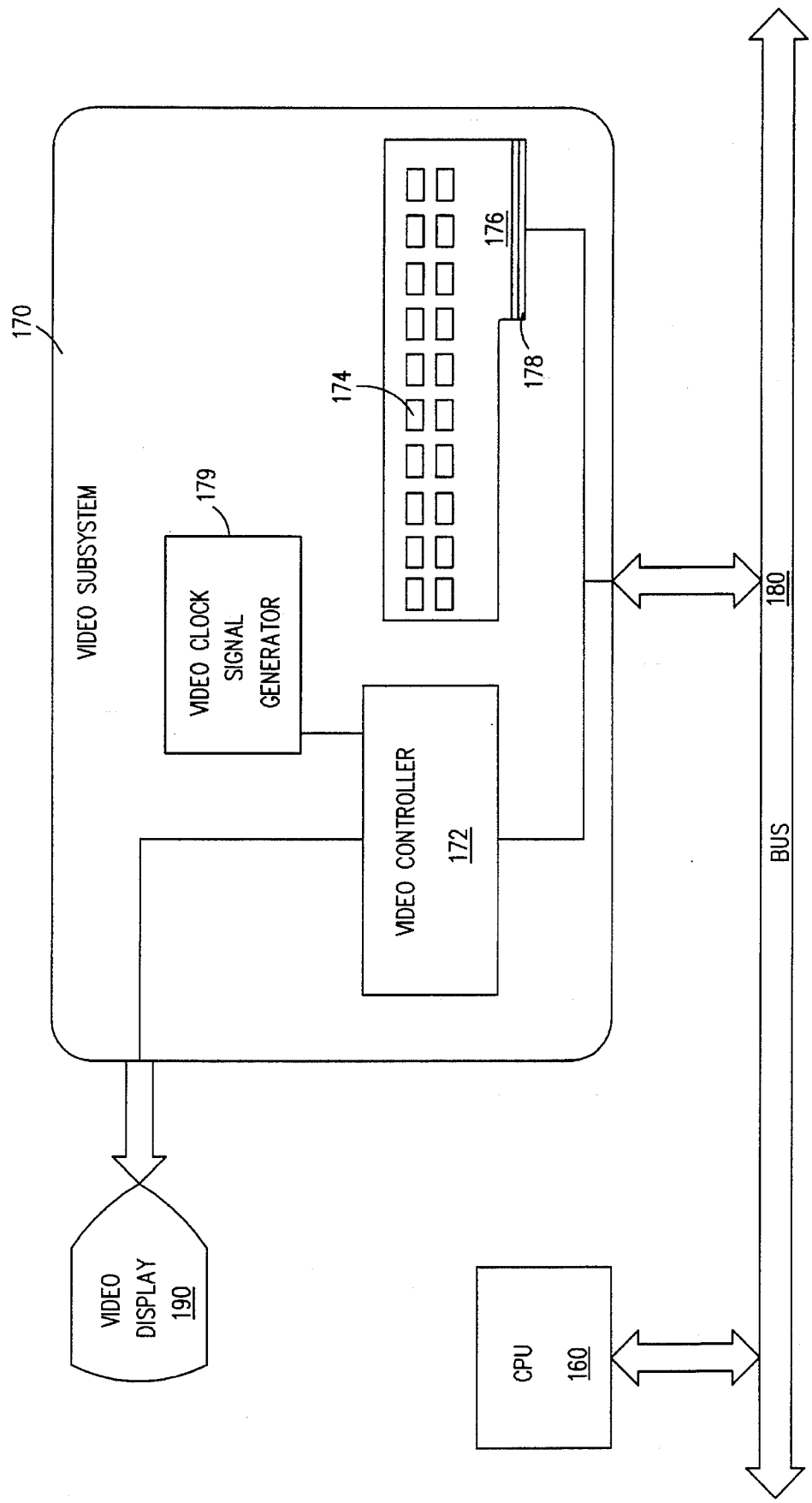
FIG. 1B illustrates a system-level block diagram of the PC of FIG. 1 A.

Turning now to FIGURE 1B, illustrated is a system-level block diagram of the PC 100 of FIG. 1A. The PC 100 includes a CPU 160 coupled to, among other things, a video subsystem 170 via a bus 180. The bus 180 allows the CPU 160 to communicate addresses, data and control signals to the video subsystem 170 to display data on a video display 190 that is coupled to the video subsystem 170. The video subsystem 170 includes a video controller 172 and video memory 174 that is conventionally located on one or more removable modular circuit boards functioning as daughter-cards 176. The daughter-cards 176 are removably insertable into module slots 178. By organizing the video memory 174 into modules, the video subsystem 170 becomes user-serviceable and readily adaptable to differing display requirements. It is understood however, that video memory may be attached directly to the motherboard.

The video memory 174 is conventionally dual-ported video random access memory ("VRAM"), allowing the CPU 160 write data to one "side" of the video memory 174 while the video memory 174 is read out to the video display 190 from the other "side." As previously described, the rate at which data are read from the other "side" of the VRAM video memory 174 is a function of a frequency of a clock signal generated in a video clock signal generator 179 and transmitted to the video controller 172. The present invention is directed to a video clock generator that can produce a frequency that depends upon the logical configuration of the video memory 174.

Figure 2:
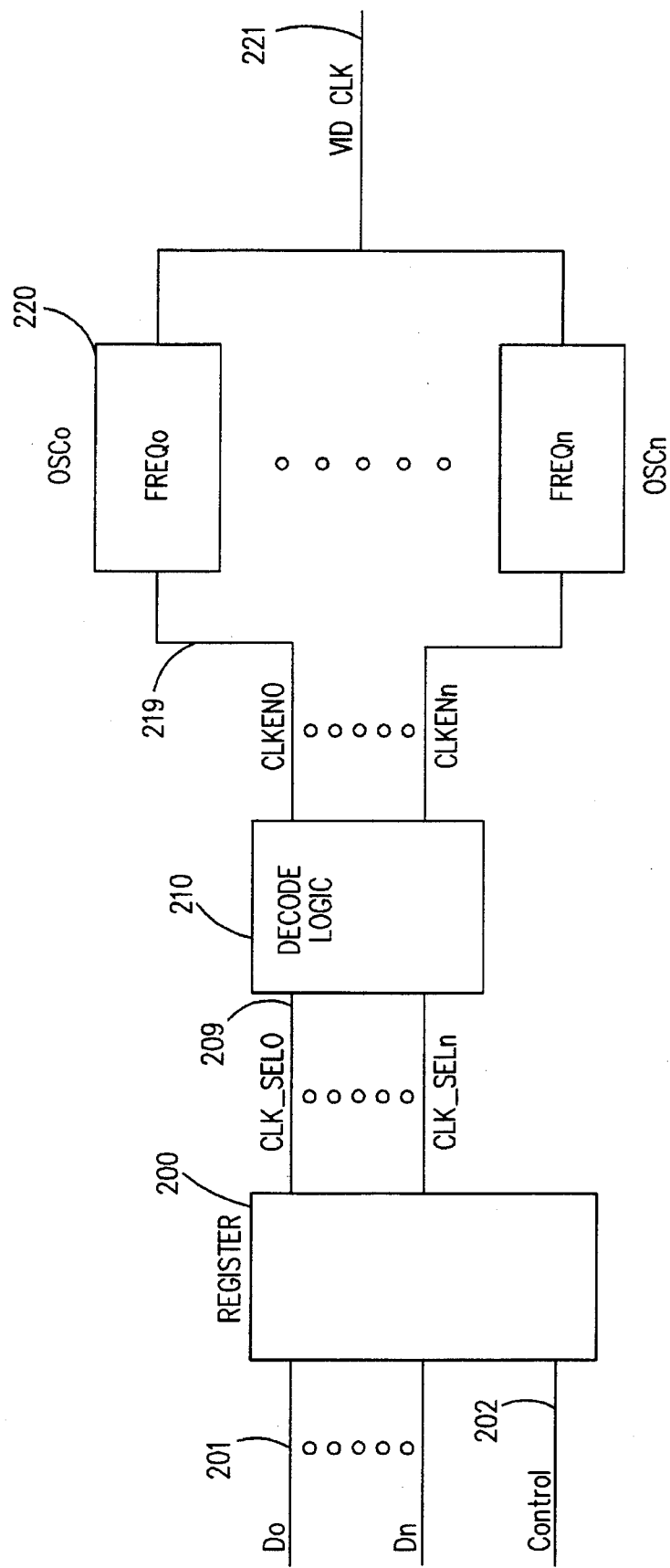
FIG. 2 illustrates an embodiment of the present invention including a circuit for determining and storing a logical configuration of a video memory module.

Turning now to FIG. 2, illustrated is an embodiment of the present invention including a circuit for determining and storing a logical configuration of a video memory module. A register 200 is employed as storage circuitry to store a number indicative of the logical configuration of the video memory 174. The number is transmitted to the register 200 via data lines 201 from either the CPU 160 or from dedicated configuration determination circuitry preferably located proximate the video subsystem 170. Those skilled in the art are familiar with conventional algorithms for determining the size (and other attributes, such as interleave) of video memory. In this embodiment of the present invention, video memory logical configuration is determined by performing a conventional algorithm either with the CPU 160 or with the dedicated configuration circuitry when the PC 100 is reset. Enablement of a control line 202 causes the register 200 to store the number generated from the algorithm and representing the logical configuration of the video memory 174.

The number stored in the register 200 is transmitted to decode logic circuitry 210 via a plurality of clock select ("CS") lines 209. In one embodiment of the present invention, there are 3 (CS0) through CS2) clock select lines 209, allowing selection of any one of 8 video clock frequencies. The decode logic circuitry 210 decodes the number supplied via the clock select lines 209 to enable only one of a plurality of conventional crystal oscillators 220.

Enablement of the chosen one of the oscillators 220 is by way of a plurality of clock enable ("CE") lines 219. To enable a particular oscillator, a conventional enable line on the oscillator is brought low. Given 3 clock select lines 209, there are 8 clock enable lines 219 (CE0 through CE7). In this case, the decode logic circuitry operates in accordance with the following truth table:

| CS0 | CS1 | CS2 | CE0 | CE1 | CE2 | CE3 | CE4 | CE5 | CE6 | CE7 |
|-----|-----|-----|-----|-----|-----|-----|-----|-----|-----|-----|
| 0 | 0 | 0 | 0 | 1 | 1 | 1 | 1 | 1 | 1 | 1 |
| 0 | 0 | 1 | 1 | 0 | 1 | 1 | 1 | 1 | 1 | 1 |
| 0 | 1 | 0 | 1 | 1 | 0 | 1 | 1 | 1 | 1 | 1 |
| 0 | 1 | 1 | 1 | 1 | 1 | 0 | 1 | 1 | 1 | 1 |
| 1 | 0 | 0 | 1 | 1 | 1 | 1 | 0 | 1 | 1 | 1 |
| 1 | 0 | 1 | 1 | 1 | 1 | 1 | 1 | 0 | 1 | 1 |
| 1 | 1 | 0 | 1 | 1 | 1 | 1 | 1 | 1 | 0 | 1 |
| 1 | 1 | 1 | 1 | 1 | 1 | 1 | 1 | 1 | 1 | 0 |

Those ordinarily skilled in the art can make and practice the decode logic circuitry 210 of this embodiment of the present invention by reference to the above truth table. The enabled oscillator 220 delivers a video clock signal to the video controller 172 via a video clock line 221.

Figure 3:
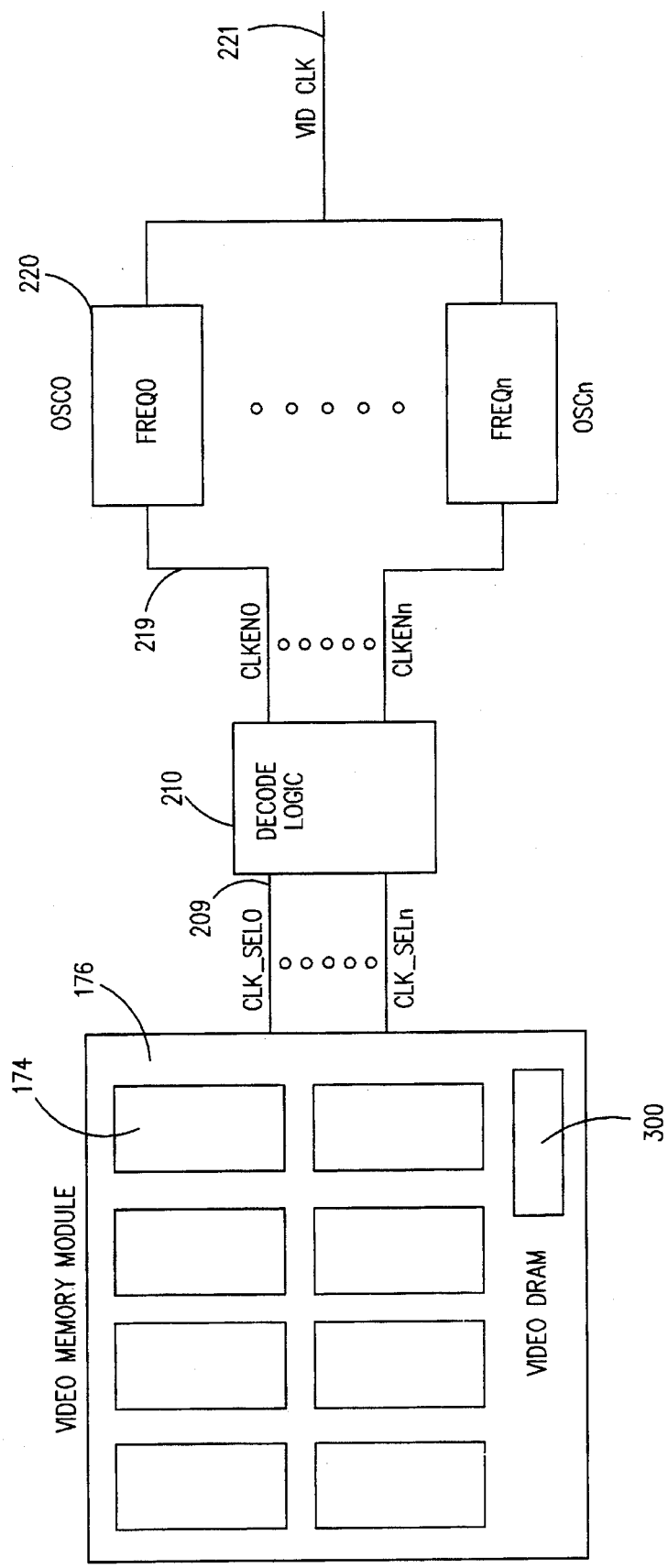
FIG. 3 illustrates an embodiment of the present invention including a hard-wired circuit preconfigured for storing a logical configuration of a video memory module.

Turning now to FIG. 3, illustrated is an embodiment of the present invention including a hard-wired circuit pre-configured for storing a logical configuration of a video memory module. The embodiment of FIG. 3 differs from that of FIG. 2 by the substitution of a hard-wired circuit 300 in lieu of the register 200 and the configuration-determining algorithms and circuitry of FIG. 2. In FIG. 3, the hard-wired circuit 300 is pre-programmed during manufacture of the module 176 with a number representing the logical configuration of the video memory 174 in the module 176. The hard-wired circuit 300 may be read-only memory ("ROM"), a plurality of switches or jumpers, programmed into a programmable logic array ("PAL") or simply lines on the circuit board brought high or low as the case may require to store the proper number. Apart from the hard-wired circuit 300, operation of the embodiment of FIG. 3 is identical to that of FIG. 2.

Figure 4:
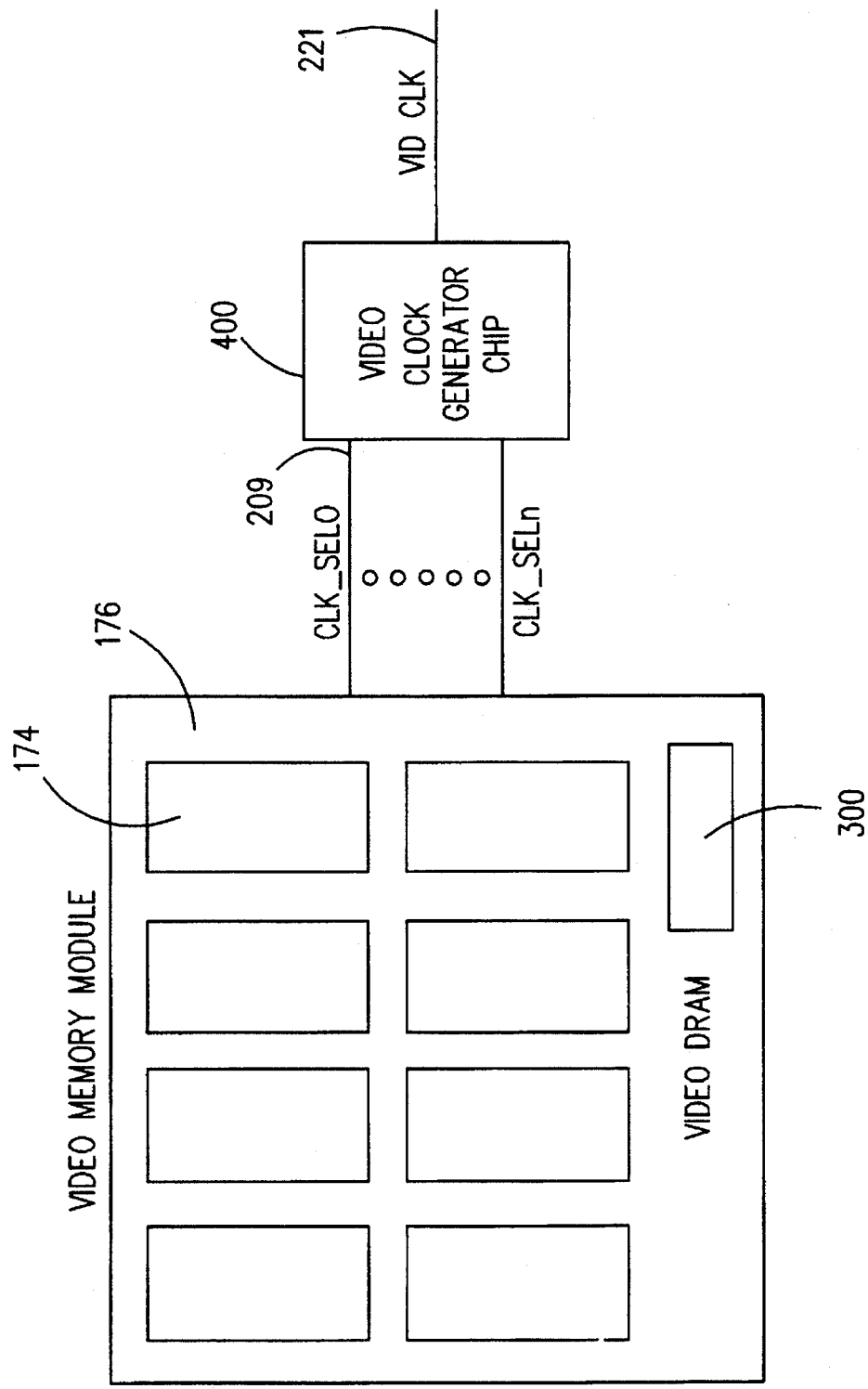
FIG. 4 illustrates a preferred embodiment of the present invention including the hard-wired circuit of FIG. 2 and a video clock generator circuit.

Turning now to FIG. 4, illustrated is a preferred embodiment of the present invention including the hard-wired circuit 300 of FIG. 2 and video clock generator circuitry 400. Operation of the hard-wired circuit 300 is as in FIG. 3. The hard-wired circuit 300 delivers its number representing the logical configuration of the video memory 174 to the video clock generator circuitry 400 via the clock select lines 209. The video clock generator circuitry 400 is a commercially available circuit and may be part no. ICS2494 manufactured by ICS Incorporated. The video clock generator circuitry 400 generates a clock signal that is a function of the state of the clock select lines 209 and, in effect, replaces the decode logic circuitry 210 and plurality of oscillators 220 of FIGS. 2 and 3.

It is important to note that, while the video clock generator circuitry 400 is adapted to produce a clock signal in response to a given number, prior art systems have provided such single number to the video clock generator circuitry 400 in an immutable manner, such as by hard-wiring the number on the circuit board of the video subsystem 170 or video controller 172. This fails to allow for changes in video clock frequency when the logical configuration of the video memory 74 changes. This especially fails to allow for such changes to occur automatically when a user or technician changes the configuration by removing, replacing or adding modules.

From the above description, it is apparent that the present invention provides a configuration-dependent video memory clock selection circuit and method. The selection circuit operates in conjunction with a removable video memory module. The module comprises: (1) a circuit board capable of insertion into the computer system as a daughter-card, (2) a plurality of video memory chips located on the circuit board and having a particular logical configuration and (3) a configuration indication circuit located on the circuit board, the indication circuit capable of providing a configuration signal representing the particular logical configuration to video clock signal generator circuitry in the computer system when the circuit board is inserted into the computer system. Thus, the configuration indication circuit and the video clock signal generator circuitry act in concert to provide a configuration-dependent video memory clock selection circuit.

Although the present invention and its advantages have been described in detail, it should be understood that various changes, substitutions and alterations can be made herein without departing from the spirit and scope of the invention as defined by the appended claims.

What is claimed is:

1. A video memory module, comprising:

a circuit board for insertion into a computer system as a daughter-card;

a plurality of video memory chips located on said circuit board and having a particular logical configuration; and a configuration indication circuit located on said circuit board, said indication circuit providing a configuration signal representing said particular logical configuration to video clock signal generator circuitry in said computer system when said circuit board is inserted into said computer system.

2. The module as recited in claim 1 wherein said indication circuit comprises a circuit for determining and storing a number representing said particular logical configuration.

3. The module as recited in claim 1 wherein said indication circuit comprises a hard-wired circuit pre-configured as a function of said particular logical configuration.

4. The module as recited in claim 1 wherein said video clock signal generator circuitry comprises:

decode logic for decoding said configuration signal into a corresponding clock frequency select signal; and an oscillator circuit receiving said corresponding clock frequency select signal and generating said video memory clock signal therefrom.

5. The module as recited in claim 1 wherein said video clock signal generator circuitry circuit comprises a video clock generator circuit for receiving said configuration signal and generating said video memory clock signal therefrom.

6. The circuit as recited in claim 1 wherein said plurality of video memory chips is interleaved.

7. A method of varying a video memory clock signal as a function of video memory configuration, comprising the steps of:

inserting a circuit board into a computer system as a daughter-card, said circuit board containing a plurality of video memory chips having a particular logical configuration and a configuration indication circuit;

transmitting a configuration signal representing said particular logical configuration from said indication circuit to video clock signal generator circuitry in said computer system; and generating said video memory clock signal having a frequency that is a function of said configuration signal.

8. The module as recited in claim 7 further comprising the steps of determining and storing a number representing said particular logical configuration with said indication circuit.

9. The method as recited in claim 7 wherein said step of transmitting comprises the step of transmitting said configuration signal from a hard-wired circuit pre-configured as a function of said particular logical configuration.

10. The method as recited in claim 7 wherein said step of generating comprises the steps of:

decoding said configuration signal into a corresponding clock frequency signal with decode logic;

receiving said corresponding clock frequency signal into an oscillator circuit; and generating said video memory clock signal with said oscillator circuit.

11. The method as recited in claim 7 wherein said step of generating comprises the steps of:

receiving said configuration signal into a video clock generator circuit; and generating said video memory clock signal with said video clock generator circuit.

12. The method as recited in claim 7 wherein said plurality of video memory chips is interleaved.

13. A computer system, comprising:

a microprocessor central processing unit (CPU);

video memory located in a removable module and coupled to said microprocessor CPU, said video memory having a particular configuration;

a first circuit located in said removable module for generating a memory configuration signal representing said particular configuration of said video memory;

a second circuit for receiving said configuration signal from said first circuit and generating, in response thereto, a configuration-dependent video memory clock signal that varies as a function of said configuration signal; and a third circuit for scanning said video memory at a rate determined by said video memory clock signal.

14. The circuit as recited in claim 13 wherein said first circuit comprises:

a fourth circuit for determining a size of said video memory and generating said configuration signal in response thereto; and a fifth circuit for storing said configuration signal for use by said second circuit.

15. The circuit as recited in claim 13 wherein said first circuit comprises a hard-wired fourth circuit associated with said video memory for generating said configuration signal, said fourth circuit being pre-configured as a function of said particular configuration.

16. The circuit as recited in claim 13 wherein said second circuit comprises:

decode logic for decoding said configuration signal into a corresponding clock frequency signal; and an oscillator circuit for receiving said corresponding clock frequency signal and generating said video memory clock signal therefrom.

17. The circuit as recited in claim 13 wherein said second circuit comprises a video clock generator circuit for receiving said configuration signal and generating said video memory clock signal therefrom.

18. The circuit as recited in claim 13 wherein said video memory is interleaved.

19. A method of generating a video memory configuration-dependent clock signal in a computer system, comprising the steps of:

providing a microprocessor central processing unit (CPU);

coupling a video memory to said microprocessor CPU, said video memory located in a removable module and having a particular configuration;

generating a memory configuration signal representing said particular configuration of said video memory with a first circuit located in said removable module;

receiving said configuration signal from said first circuit into a second circuit, said second circuit generating, in response thereto, a configuration-dependent video memory clock signal that varies as a function of said configuration signal; and scanning said video memory with a third circuit at a rate determined by said video memory clock signal.

20. The method as recited in claim 19 further comprising the steps of:

determining a size of said video memory with a fourth circuit, said fourth circuit generating said configuration signal in response thereto; and storing said configuration signal for use by said second circuit in a fifth circuit.

21. The method as recited in claim 19 wherein said step of generating comprises the step of generating said configuration signal with a hard-wired fourth circuit associated with said video memory, said fourth circuit being pre-configured as a function of said particular configuration.

22. The method as recited in claim 19 wherein said step of receiving comprises the steps of:

decoding said configuration signal into a corresponding clock frequency signal with decode logic; and receiving said corresponding clock frequency signal into an oscillator circuit, said oscillator circuit generating said video memory clock signal from said corresponding clock frequency signal.

23. The method as recited in claim 19 wherein said step of receiving comprises the step of receiving said configuration signal into a video clock generator circuit, said video clock generator circuit generating said video memory clock signal from said configuration signal.

24. The method as recited in claim 19 wherein said video memory is interleaved.

25. A personal computer (PC), comprising:

a microprocessor central processing unit (CPU);

a video memory module coupled to said microprocessor CPU, said video memory having a particular configuration and for being coupled to and decoupled from said CPU as a module;

a hard-wired memory configuration circuit within said video memory module for generating a memory configuration signal representing said particular configuration of said video memory on a plurality of clock select lines on said video memory module;

a video clock generator circuit coupled to said plurality of clock select lines, for receiving said memory configuration signal from said memory configuration circuit and generating, in response thereto, a configuration-dependent video memory clock signal that varies as a function of said configuration signal; and a video controller circuit for scanning said video memory at a rate determined by said video memory clock signal.

26. The circuit as recited in claim 25 wherein said video memory is interleaved.

27. A method of scanning video memory in a personal computer (PC), comprising the steps of:

providing a microprocessor central processing unit (CPU); coupling a video memory module to said microprocessor CPU, said video memory having a particular configuration and for being coupled to and decoupled from said CPU as a module;

generating a memory configuration signal with a hard-wired memory configuration circuit within said video memory module, said memory configuration signal representing said particular configuration of said video memory on a plurality of clock select lines on said video memory module;

receiving said memory configuration signal from said memory configuration circuit into a video clock generator circuit coupled to said plurality of clock select lines, said video clock generator circuit generating, in response thereto, a configuration-dependent video memory clock signal that varies as a function of said configuration signal; and scanning said video memory at a rate determined by said video memory clock signal with a video controller circuit.

28. The circuit as recited in claim 27 wherein said video memory is interleaved.

* * * * *